(12) United States Patent
Newman et al.

(10) Patent No.: US 7,024,457 B1
(45) Date of Patent: Apr. 4, 2006

(54) E-MAIL SYNCHRONIZATION BETWEEN HETEROGENEOUS MAIL SERVERS

(75) Inventors: Robert D. Newman, Highland Park, IL (US); Sanford Schleicher, Northbrook, IL (US)

(73) Assignee: j2 Global Communications, Inc., Hollywood, CA (US)

( * ) Notice: Subject to any disclaimer, the term of this patent is extended or adjusted under 35 U.S.C. 154(b) by 0 days.

(21) Appl. No.: 09/505,674

(22) Filed: Feb. 17, 2000

(51) Int. Cl.
*G06F 15/16* (2006.01)

(52) U.S. Cl. ............... 709/206; 709/203; 709/248; 379/67.1; 379/88.13; 379/100.08; 707/10; 707/201

(58) Field of Classification Search ............. 709/206, 709/217, 207, 238, 203, 248; 707/201, 10; 455/412; 379/88.13, 88.17, 67.1, 100.08
See application file for complete search history.

(56) References Cited

U.S. PATENT DOCUMENTS

| | | | |
|---|---|---|---|
| 5,647,002 A * | 7/1997 | Brunson ............... | 709/206 |
| 5,758,354 A * | 5/1998 | Huang et al. ........... | 707/201 |
| 5,961,590 A * | 10/1999 | Mendez et al. .......... | 709/206 |
| 6,018,762 A * | 1/2000 | Brunson et al. ......... | 709/206 |
| 6,131,096 A | 10/2000 | Ng et al. | |
| 6,151,606 A * | 11/2000 | Mendez ............... | 707/201 |
| 6,223,216 B1 * | 4/2001 | Nalder ............... | 709/217 |
| 6,289,212 B1 * | 9/2001 | Stein et al. ........... | 455/412 |
| 6,304,881 B1 * | 10/2001 | Halim et al. ........... | 707/201 |
| 6,330,589 B1 * | 12/2001 | Kennedy ............. | 709/206 |
| 6,360,272 B1 * | 3/2002 | Lincke et al. ........... | 709/238 |
| 6,601,088 B1 * | 7/2003 | Kelley et al. ........... | 709/206 |
| 6,662,212 B1 * | 12/2003 | Chandhok et al. ....... | 709/206 |
| 6,697,458 B1 * | 2/2004 | Kunjibettu ............ | 379/88.17 |
| 6,711,609 B1 * | 3/2004 | Boyer et al. ........... | 709/206 |
| 6,792,085 B1 * | 9/2004 | Rigaldies et al. ........ | 379/88.13 |

* cited by examiner

*Primary Examiner*—Saleh Najjar
*Assistant Examiner*—ThuHa Nguyen
(74) *Attorney, Agent, or Firm*—Blakely, Sokoloff, Taylor & Zafman LLP

(57) ABSTRACT

A method or system for synchronizing e-mail messages for a user, particularly for POP3 protocols. E-mail messages addressed to the user are received at an e-mail control at a local server, from an external e-mail server. The e-mail control stores each e-mail message in a consolidated e-mail storage at the local server. The e-mail control stores a message identifier for each e-mail message, in a message identifier storage at the local server. It is determined whether an e-mail message in the consolidated e-mail storage has been deleted from the external e-mail server, and if so, then the e-mail message is deleted from the consolidated e-mail storage.

The invention provides for forward and/or reverse synchronization of e-mail messages. Optionally, the step of determining includes comparing message identifiers in the message identifier storage to message identifiers in e-mail received from the external e-mail server. Alternatively, the step of determining includes comparing the message identifiers of e-mail on the external e-mail server to the message identifiers in the message identifier storage, or, comparing the message identifiers in the message identifier storage to the message identifiers of e-mail in the consolidated e-mail storage.

17 Claims, 5 Drawing Sheets

E-MAIL SYNCHRONIZATION BETWEEN HETEROGENEOUS MAIL SERVERS

BACKGROUND OF THE INVENTION

1. Field of the Invention

The present invention relates to the storage and retrieval of e-mail messages. More particularly, it relates to synchronizing e-mail messages for the same user amongst multiple mailboxes, on heterogeneous servers.

2. Description of the Related Art

An e-mail user may have more than one e-mail account on different mail servers. Mail for the user may be forwarded to one of the servers, or mail may be consolidated at one server.

This creates duplicate e-mail messages on the different servers. Each of the duplicate messages then must be separately read and deleted, unfortunately requiring additional time and attention from the user.

This problem is particularly acute for mail servers where there is no conventional technology enabling synchronization between two or more such mail servers. An example of this is POP3 mail servers. Most commercial external e-mail servers offer only the POP3 protocol for e-mail retrieval, thus making the problem both more universal and more severe.

The IMAP4 protocol was built to solve the mailbox synchronization problem, however, it is not available on most internet email servers.

Various formats for e-mail messages have been prescribed. One widely-used standardized format for e-mail message is encouraged by RFC 822, expressly incorporated herein by reference. These standards use, among other things, a message identifier which is intended to be unique to an e-mail. These standards do not, however, provide a way to synchronize or consolidate e-mail.

BRIEF SUMMARY OF THE INVENTION

According to the invention, there is provided a method or system for synchronizing e-mail messages for a user. E-mail messages addressed to the user are received at an e-mail control at a local server, from an external e-mail server. The e-mail control stores each e-mail message in a consolidated e-mail storage at the local server. The e-mail control stores a message identifier for each e-mail message, in a message identifier storage at the local server. It is determined whether an e-mail message in the consolidated e-mail storage has been deleted from the external e-mail server, and if so, then the e-mail message is deleted from the consolidated e-mail storage.

Optionally, the invention includes multiple external e-mail servers. A further option is, responsive to a user command, providing e-mail messages from the consolidated e-mail storage, to the user. In another alternative, the system is used by multiple users, and the consolidated e-mail storage includes storage for e-mail associated with other users. Optionally, the step of determining includes comparing message identifiers in the message identifier storage to message identifiers in e-mail received from the external e-mail server. Alternatively, the step of determining includes comparing the message identifiers of e-mail on the external e-mail server to the message identifiers in the message identifier storage, or, comparing the message identifiers in the message identifier storage to the message identifiers of e-mail in the consolidated e-mail storage.

According to a further option, the local server connects to the external e-mail server, as the user. E-mail messages for the user are requested from the external e-mail server.

These and other objects, features and advantages of the present invention are readily apparent from the following drawings and detailed description.

DETAILED DESCRIPTION OF THE PREFERRED EMBODIMENT

Figure 1:
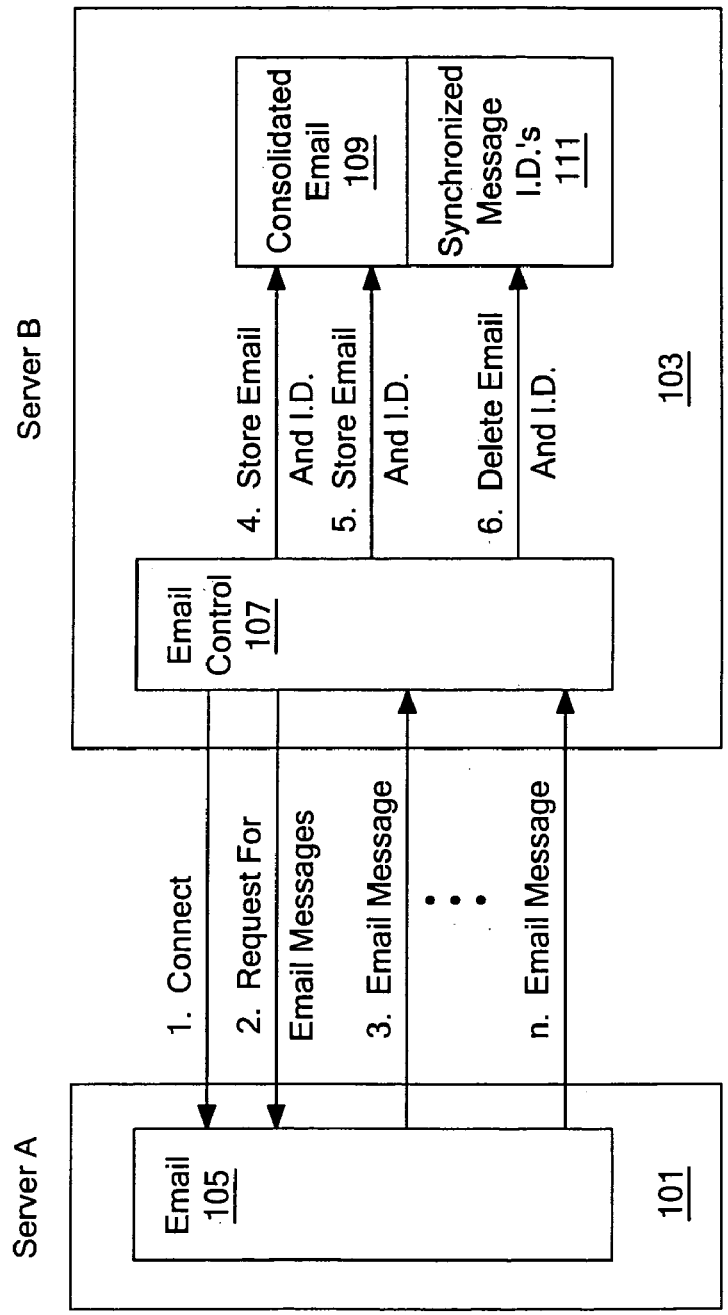
FIG. 1 is a block diagram illustrating forward synchronization of e-mail messages, according to the invention.

Reference is made to FIG. 1, illustrating a simple example of forward synchronization of e-mail messages. An e-mail system includes server A 101, server B 103, stored e-mail 105, e-mail control 107, consolidated e-mail 109, and synchronized message identification numbers (message i.d.) 111.

In this simple example, Server A 101 has stored e-mail 105 for a particular user, and thus functions as the user's primary (and only, in this example) mail server. It is possible, as discussed below in connection with FIG. 5, for a particular user to have multiple e-mail accounts on several servers. Server A could be any computer system configured for e-mail storage and/or retrieval. Numerous conventional systems are appropriate.

Server B 103 includes e-mail control 107, consolidated e-mail 109, and synchronized message i.d.'s 111. Server B functions as the consolidating mail server, which a user may use to see a combination of all of the user's messages.

E-mail control 107 provides synchronization control of e-mail from the user's external e-mail servers. This is described in detail below.

The consolidated e-mail 109 is advantageously a storage of e-mail, reflecting the last-updated combined e-mail for the user. (The e-mail control may be used by multiple e-mail users, and thus the consolidated e-mail may be used by multiple different users under various known techniques for sharing storage space.) The consolidated e-mail should be stored in order to reflect accurately all of the last updated e-mail, including contents thereof. Preferably, the consolidated e-mail 109 are located on or are rapidly accessible by the server B 103.

Preferably, the system includes the synchronized message i.d.'s 111. It is advantageously a stored list of message i.d.'s. Each conventional e-mail is provided with a unique message i.d., to identify identical e-mail messages. Each of the synchronized message i.d.'s correspond to one of the combined e-mail messages in the consolidated e-mail 109. It is advantageous to utilize the list of message i.d.'s in order to rapidly determine the contents of the consolidated e-mail; although optional, this is preferred.

On a periodic basis, forward synchronization is performed as follows. The e-mail control 107 connects 1 to each of the mail servers (in this example, Server A 101) and requests e-mail messages 2 stored on Server A for a user. Server A sends e-mail messages 3 . . . n to Server B. Preferably, the e-mail and the message i.d. of each e-mail is stored in the consolidated e-mail 109 (steps 4, 5). The message i.d.s of e-mail on Server A 101 are compared to message i.d.s stored in the consolidated e-mail 109. If a message i.d. for an e-mail in the consolidated e-mail 109 (that originated from Server A) no longer has a counterpart on Server A 101, the message and the message i.d., is removed from Server B (step 6).

Figure 2:
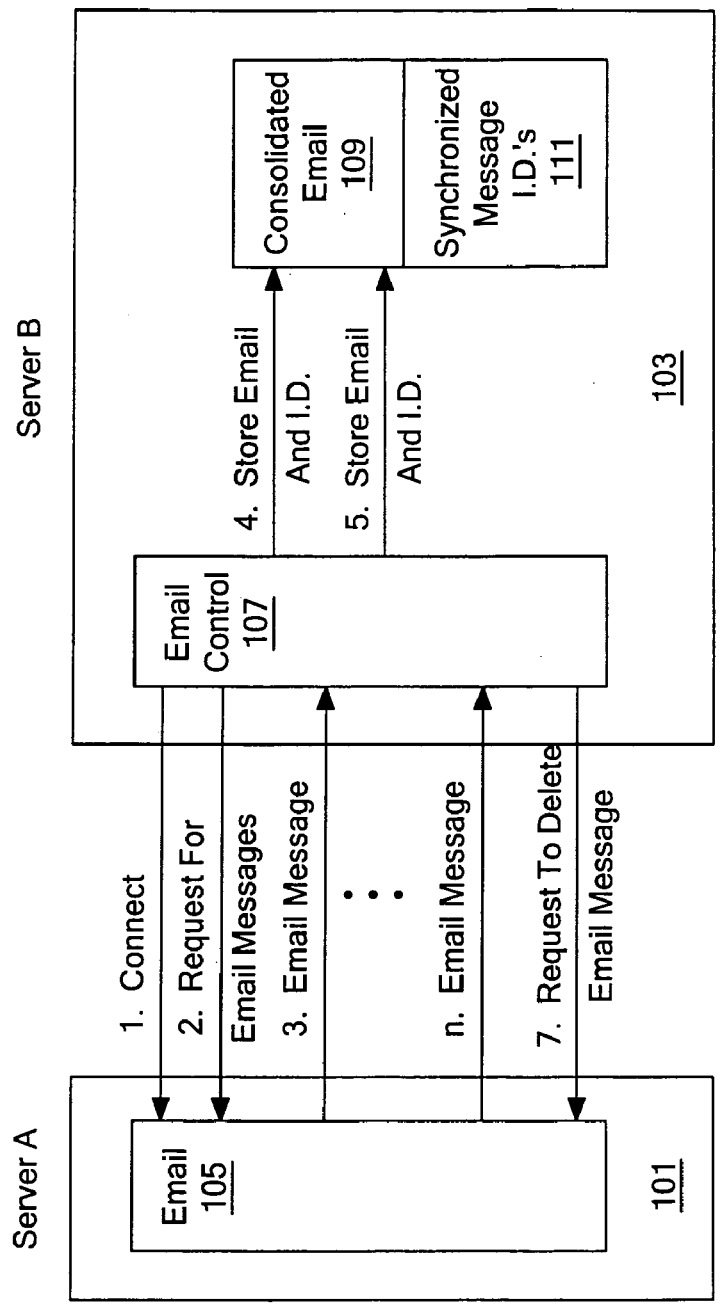
FIG. 2 is a block diagram illustrating reverse synchronization.

FIG. 2 illustrates a simple example of reverse synchronization, which can be used in conjunction with, or independently from, forward synchronization. Forward synchronization is used when the e-mail account on Server A is the controlling mailbox, and reverse synchronization is used when the e-mail account on Server B is the controlling mailbox. If either side should update the other, then both forward and reverse synchronization can be used together. After performing the connection, as above, all message i.d.'s in the synchronized message i.d.'s database 111 are checked against the consolidated e-mail 109. If e-mail no longer exists in the consolidated e-mail, then the e-mail control will remove the message from Server A (for example, by sending a request to delete the e-mail message).

Figure 3:
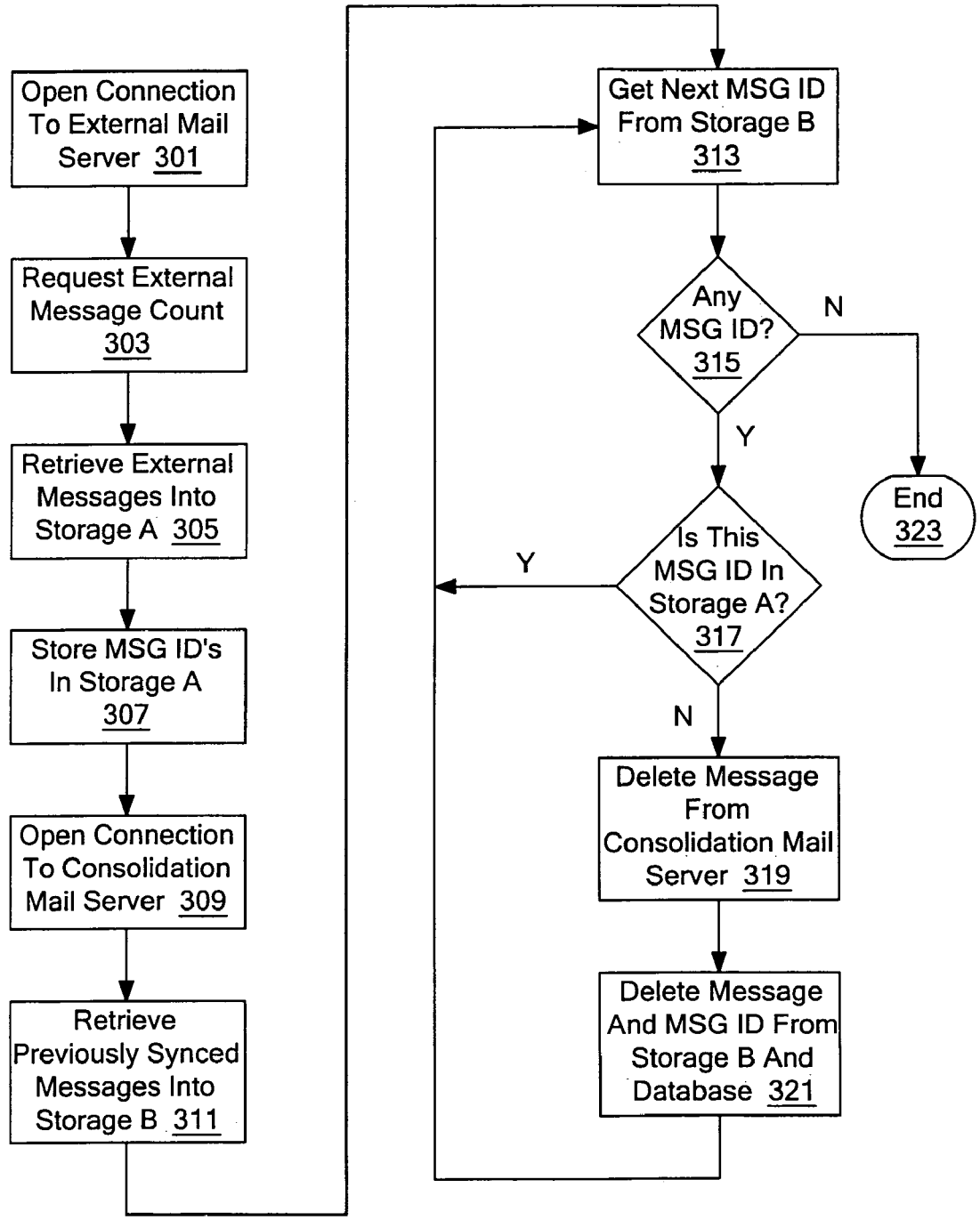
FIG. 3 is a flow chart illustrating the preferred embodiment of forward synchronization.

FIG. 3 is a flow chart illustrating the preferred embodiment of forward synchronization.

At step 301, the e-mail control opens a connection to an external mail server. At step 303, the e-mail control requests an external message count of e-mails on the external mail server. At step 305, the e-mail control retrieves the e-mail messages from the external mail server into storage A (preferably local storage). At step 307, the e-mail control stores the message i.d.'s for the retrieved e-mail messages in storage A.

At step 309, the e-mail control opens a connection to the consolidation mail server. At step 311, the e-mail control retrieves previously synced messages into a storage B. The previously synced messages are advantageously located in Server B's e-mail store, and are previously stored there from a previously run consolidation process. At step 313, the next message i.d. is retrieved by the e-mail control from the next e-mail in storage B. At step 315, the e-mail control checks for any next message i.d. If there is no message i.d., this process ends 323. If there is a next message i.d., and if the next message i.d. is present in storage A (step 317), the e-mail control simply returns to step 313. If there is a next message i.d., and the next message i.d. is not present in storage A (step 317), the message control deletes the message from the consolidation mail server (step 319); deletes the message and the message i.d. from the storage B message i.d. database, and returns to step 313.

The following instructions are one example of a POP3 Forward Sync according to the invention:
1. Open a POP3 connection to external mail server A.
2. Log in with Username and password.
3. Request message count.
4. Retrieve all messages into memory ("collection A"). Collection A represents all messages on the external mail server.
5. Scan each retrieved message header for the message i.d., and save the message i.d. in collection A.
6. Open an IMAP4 connection to consolidation mail server B.
7. Login with user name and password.
8. Open a connection to a local database storage for message i.d.s.
9. Read into collection B previously synched message ids for this user. Collection B represents all previously synched messages.
10. Get first (next) message i.d. from collection B. At the end of the collection, the process is complete.
11. Check to see if this message i.d. exists in collection A.
12. If it does exist, skip it and go back to step 10.
13. If it does not exist, do a command (e.g., IMAP Delete) to remove e-mail message from Consolidation mail server B.
14. Delete this message from collection B and from the message i.d. database.
15. Continue with step 10.

Figure 4:
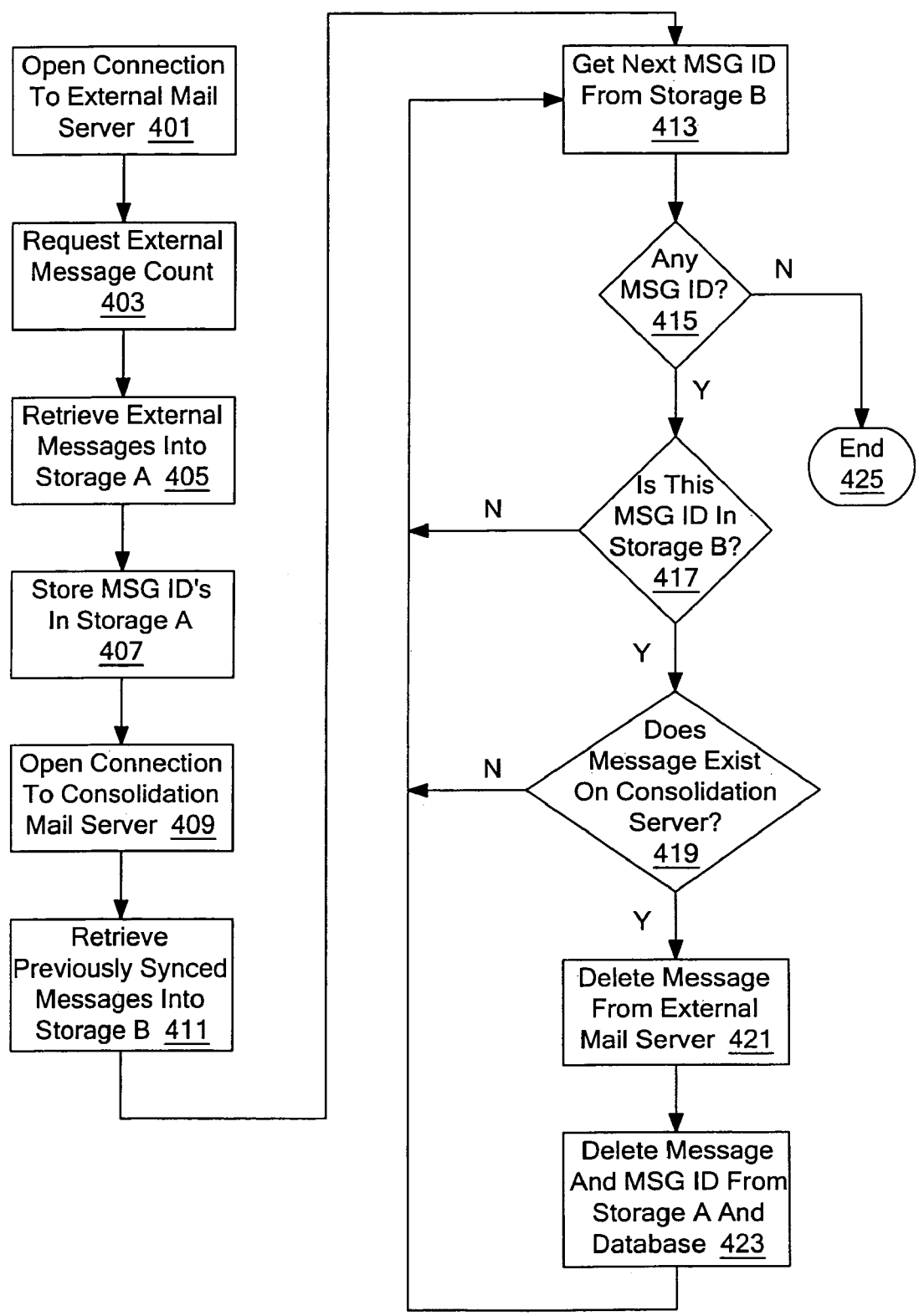
FIG. 4 is a flow chart illustrating the preferred embodiment of reverse synchronization.

FIG. 4 is a flow chart illustrating the preferred embodiment of reverse synchronization. In step 401, the e-mail control opens a connection to the external mail server. At step 403, the e-mail control requests an external e-mail message count. At step 405, the e-mail control retrieves the external e-mail messages into storage A, and at step 407, the e-mail control stores the message i.d.'s for the retrieved message in storage A.

At step 409, the e-mail control opens a connection to the consolidation mail server. At step 411, previously synched messages are stored into storage B. At step 413, the e-mail control gets the next message i.d. from the next e-mail in storage B. At step 415, the e-mail control checks whether there was a next message i.d. If there was no next message i.d., the process ends (step 425). If there is a next message i.d. (step 415), and if the message i.d. is not in storage B (step 417), e-mail control returns to step 413. If there was a next message i.d. (step 415), and if the message i.d. exists in storage (step 417) and the message exists on the consolidation server (step 419), e-mail control returns to step 413. If there was a next message i.d. (step 415), and if the message i.d. exists in storage b (step 417), and if the message does not exist on the consolidation server (step 419), then the e-mail control deletes the message from the external mail server (step 421), deletes the message and message i.d. from storage A and the local message i.d. database (step 423), and returns to step 413.

The following is an example of a POP3 Reverse Sync according to the invention:
1. Open a POP3 connection to an external mail server (server A).
2. Login with user name and password.
3. Request the message count.
4. Retrieve all message into a memory collection, collection A. Collection A will represent all message on the external mail server.
5. Scan each retrieved message header for the message i.d., and save the message i.d.s in collection A.
6. Open an IMAP4 connection to the consolidation mail server (server B).
7. Login with user name and password.
8. Open a connection to local database storage for synched message ids
9. Read from the database into collection B, all previously synched message ids for this user. Collection B then represents all previously synched message.
10. Get the first (next) message i.d. from collection A. At the end of collection A, the process is complete.
11. Check to see if the message i.d. for the retrieved message exists in the consolidated mail server, by looking through the message id collection.
12. If it does not exist, skip it and go back to step 10.
13. If it does exist, do a search to see if this message exists in the email account on the consolidated mail server, server B.
14. If the message does not exist, delete the message from the external mail server with an appropriate command, such as POP3 Delete. Delete the message from collection A and remove the message i.d. from the local message i.d. database.

15. If the message does exist, skip this message and go back to step 10.

Figure 5:
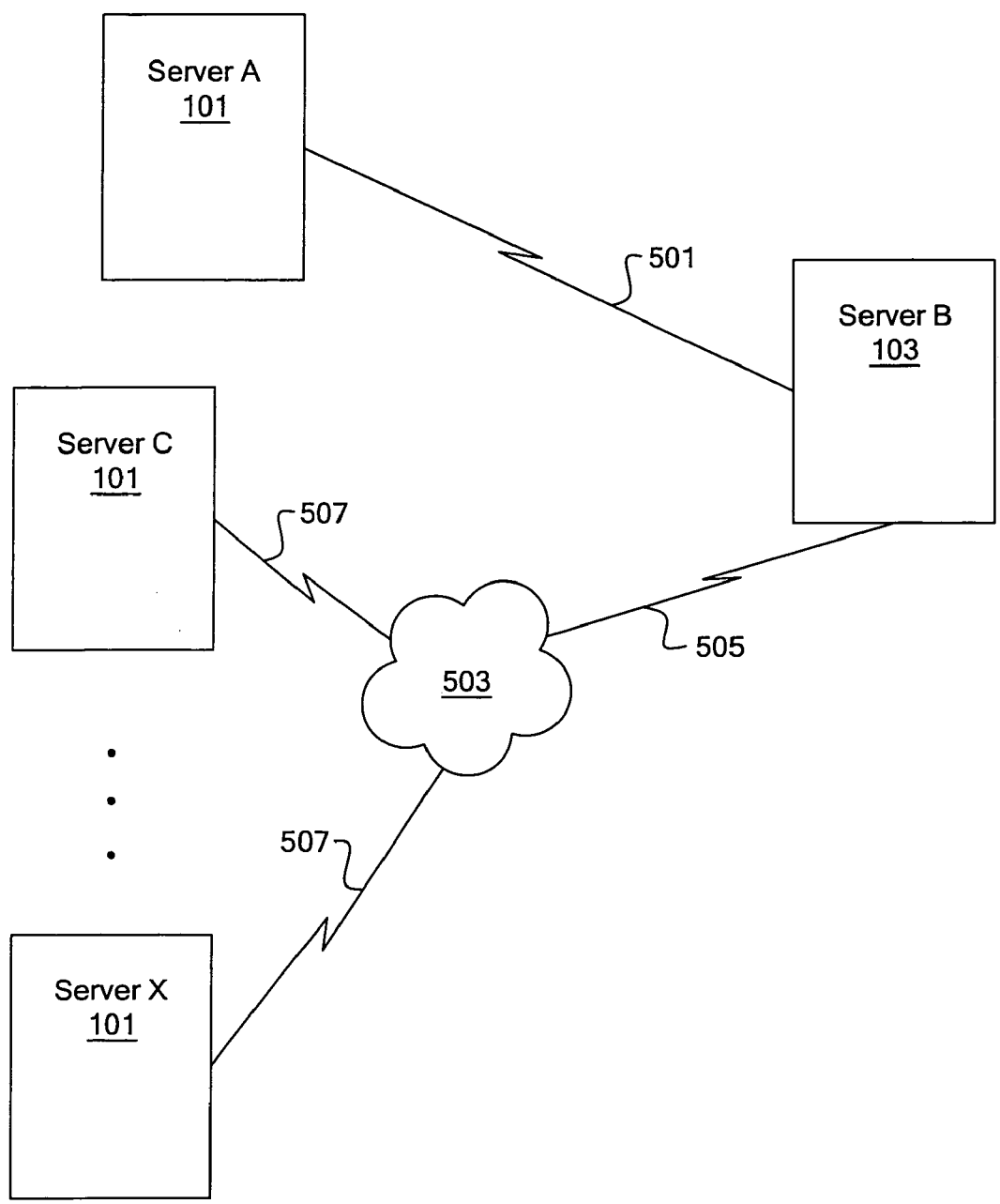
FIG. 5 is a block diagram illustrating use of the invention with multiple mail accounts on multiple mail servers.

FIG. 5 is a block diagram illustrating multiple e-mail accounts on multiple servers. A user might have an e-mail account on more than one server. In the illustration, the user has an e-mail account on server A 101, via a local network connection 501; and servers C.X 101 via an internet connection 503, 505, 507. A user could also have an e-mail account on server B 103, the e-mail system including the e-mail control.

When a user has more than one e-mail account, the e-mail control would contact each of the servers on which the user has an e-mail account, in order to update the consolidated e-mail. The databases would include an identifier indicating the external e-mail server on which the e-mail originated. Conventionally, the Server Name or Domain Name would uniquely identify each server.

The consolidated e-mail could be updated on a predetermined periodic schedule, or alternatively as initiated by a user or system operator.

While the preferred mode and best mode for carrying out the invention have been described, those familiar with the art to which this invention relates will appreciate that various alternative designs and embodiments for practicing the invention are possible, and will fall within the scope of the following claims.

What is claimed is:

1. A method for synchronizing e-mail messages for a user, comprising:
   (A) receiving, at an e-mail control at a local server, a plurality of e-mail messages addressed to the user, from an external e-mail server;
   (B) storing, by the e-mail control, each e-mail message of the plurality of e-mail messages, in a consolidated e-mail storage at the local server that reflects a last updated combined e-mail for the user;
   (C) storing, by the e-mail control, a message identifier for each e-mail message, in a message identifier storage at the local server;
   (D) determining whether an e-mail message in the consolidated e-mail storage has been deleted from the external e-mail server by comparing message identifiers in the message identifier storage to message identifiers in e-mail received from the external e-mail server, and if so, then deleting the e-mail message from the consolidated e-mail storage of the local server;
   performing (A), (B), (C), and (D) for at least one next external e-mail server; and
   responsive to a user command, providing e-mail messages from the consolidated e-mail storage, to the user.

2. The method as claimed in claim 1, wherein the consolidated e-mail storage includes storage for e-mail associated with other users.

3. The method as claimed in claim 1, further comprising the local server connecting to the external e-mail server, as the user.

4. The method as claimed in claim 1, further comprising requesting, from the external e-mail server, e-mail messages for the user.

5. The method as claimed in claim 1, wherein the determining includes comparing message identifiers of e-mail on the external e-mail server to message identifiers in the message identifier storage, and if a message identifier for an e-mail in the consolidated storage no longer has a counterpart on the external server then said e-mail is removed from the local server.

6. The method as claimed in claim 1, wherein the determining includes comparing message identifiers in the message identifier storage to message identifiers of e-mail in the consolidated e-mail storage.

7. A method for synchronizing e-mail messages for a user, comprising:
   (A) a local server connecting to an external e-mail server, as the user; and requesting e-mail messages for the user;
   (B) receiving, at an e-mail control at the local server, a plurality of e-mail messages addressed to the user, from the external e-mail server;
   (C) storing, by the e-mail control, each e-mail message of the plurality of e-mail messages, in a consolidated e-mail storage at the local server that reflects a last updated, combined e-mail for the user, wherein the consolidated e-mail storage includes storage for e-mail associated with other users;
   (D) storing, by the e-mail control, a message identifier for each external e-mail message, in a message identifier storage at the local server;
   (E) determining whether an e-mail message in the consolidated e-mail storage has been deleted from the external e-mail server, including comparing message identifiers in the message identifier storage to message identifiers in e-mail received from the external e-mail server; and if so, then deleting the e-mail message from the consolidated e-mail storage;
   (F) responsive to a user command, providing e-mail messages from the consolidated e-mail storage, to the user; and
   (G) wherein steps (B), (C) (D) and (E) are performed for at least one next external e-mail server.

8. The method as claimed in claim 7, wherein the determining includes comparing message identifiers of e-mail on the external e-mail server to message identifiers in the message identifier storage.

9. A system for synchronizing e-mail messages for a user, comprising:
   (A) an e-mail control at a local server, for receiving a plurality of e-mail messages addressed to the user, from a plurality of external e-mail servers;
   (B) consolidated e-mail storage at the local server, accessed by the e-mail control, having each e-mail message of the plurality of e-mail messages and that reflects a last updated combined e-mail for the user;
   (C) message identifier storage at the local server, accessed by the e-mail control, having a message identifier for each external e-mail message; and
   (D) the consolidated e-mail storage having at least two states, including a first state having at least one e-mail message which has been deleted from one of the external e-mail servers; and a second state having no e-mail message which has been deleted from said one of the external e-mail servers wherein one of the two states is determined on a basis of compared message identifiers in the message identifier storage to message identifiers in e-mail received from an external e-mail server and wherein the system includes a user command for providing e-mail message from the consolidated e-mail storage, to the user.

10. The system as claimed in claim 9, wherein the consolidated e-mail storage includes storage for e-mail associated with other users.

11. The system as claimed in claim 9, wherein the local server is connected to the external e-mail server via a POP3 connection, as the user.

12. The system as claimed in claim 9, wherein the e-mail messages that are received from the external e-mail server, are e-mail messages for the user.

13. The system as claimed in claim 9, wherein one of the two states is determined on the basis of compared message identifiers of e-mail on the external e-mail server to message identifiers in the message identifier storage.

14. The system as claimed in claim 9, wherein the state one of the two states is determined on the basis of compared message identifiers of e-mail on the external e-mail server to message identifiers of e-mail in the consolidated e-mail storage.

15. A system for synchronizing e-mail messages for a user, comprising:
- (A) an e-mail control at a local server, for receiving a plurality of e-mail messages addressed to the user, from an external e-mail server;
- (B) consolidated e-mail storage at the local server, accessed by the e-mail control, having each e-mail message of the plurality of e-mail messages and that reflects a last updated, combined e-mail for the user;
- (C) message identifier storage at the local server, accessed by the e-mail control, to store a message identifier for each external e-mail message;
- (D) the consolidated e-mail storage having at least two states, including a first state having at least one e-mail message which has been deleted from the external e-mail server; and a second state having no e-mail message which has been deleted from the external e-mail server;
- (E) wherein there are provided a plurality of external e-mail servers having e-mail messages for the user;
- (F) a user command for providing e-mail messages from the consolidated e-mail storage, to the user;
- (G) wherein the consolidated e-mail storage includes storage for e-mail associated with other users; and
- (H) wherein one of the two states is determined on the basis of compared message identifiers in the message identifier storage to message identifiers in e-mail received from the external e-mail server.

16. The system as claimed in claim 15, wherein one of the two states is determined on the basis of compared message identifiers of e-mail on the external e-mail server to message identifiers in the message identifier storage.

17. The system as claimed in claim 15, wherein one of the two states is determined on the basis of compared message identifiers in the message identifier storage to message identifiers of e-mail in the consolidated e-mail storage.

* * * * *